US006829564B2

(12) United States Patent
Tanaka et al.

(10) Patent No.: US 6,829,564 B2
(45) Date of Patent: Dec. 7, 2004

(54) USABILITY EVALUATION SUPPORT APPARATUS

(75) Inventors: Toru Tanaka, Ashigarakami-gun (JP); Toshie Mihira, Ashigarakami-gun (JP); Yoshitsugu Hirose, Ashigarakami (JP); Kazuo Shibuta, Ashigarakami-gun (JP); Tsutomu Ohyama, Ashigarakami-gun (JP); Katsura Sakai, Ashigarakami-gun (JP); Hideto Yuzawa, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 26 days.

(21) Appl. No.: 10/360,910

(22) Filed: Feb. 10, 2003

(65) Prior Publication Data

US 2004/0049366 A1 Mar. 11, 2004

(30) Foreign Application Priority Data

Sep. 9, 2002 (JP) ........................................ 2002-262357

(51) Int. Cl.⁷ .............................................. G06F 11/30
(52) U.S. Cl. ..................................... 702/182; 702/179
(58) Field of Search .............................. 73/1.01; 700/1, 700/28, 32, 51, 83, 86, 89, 90, 95, 108, 111; 702/127, 179, 181, 182, 183, 185, 108; 717/124, 131

(56) References Cited

U.S. PATENT DOCUMENTS

| | | | | |
|---|---|---|---|---|
| 5,041,972 A | * | 8/1991 | Frost ........................... | 705/10 |
| 5,084,819 A | * | 1/1992 | Dewey et al. ............... | 434/262 |
| 5,086,393 A | * | 2/1992 | Kerr et al. ................... | 702/186 |
| 5,496,175 A | * | 3/1996 | Oyama et al. ............... | 434/118 |
| 5,651,112 A | * | 7/1997 | Matsuno et al. ............. | 714/47 |
| 5,724,262 A | * | 3/1998 | Ghahramani ................ | 702/186 |
| 5,808,908 A | * | 9/1998 | Ghahramani ................ | 702/182 |
| 6,047,261 A | * | 4/2000 | Siefert ......................... | 705/11 |

FOREIGN PATENT DOCUMENTS

| | | |
|---|---|---|
| JP | A 7-56730 | 3/1995 |
| JP | A 8-36510 | 2/1996 |
| JP | A 8-153022 | 6/1996 |
| JP | A 8-161197 | 6/1996 |
| JP | A 10-124583 | 5/1998 |
| JP | A 2000-293501 | 10/2000 |
| JP | A 2001-51876 | 2/2001 |
| JP | A 2001-56771 | 2/2001 |
| JP | A 2002-123452 | 4/2002 |
| JP | A 2002-149633 | 5/2002 |
| JP | A 2002-169708 | 6/2002 |
| JP | A 2002-175290 | 6/2002 |

OTHER PUBLICATIONS

Seffah, A; Djouab, R; Antunes, H; "Comparing and Reconciling Usability Centered and Case–Driven Requirements Engineering Processes"; Proceedings 2nd Australian User Interface Conference; Jan. 29–Feb. 1, 2001; pp 132–139.*
Gutwin, C; Greenberg, S; "The Mechanics of Collaberation: Developing Low Cost Usability Evaluation Methods For Shared Workspaces"; IEEE 9th In'tl Workshop on Enabling Technologies: Infrastructure for Collabrative Enterprises; Jun. 14–16, 2000; pp98–103.*
Rosenbaum, S; Usability Evaluations Versus Usability Testing: When and Why?; IEEE Transactions on Professional Communication; vol. 32, issue 4; 1989; pp 210–216.*

(List continued on next page.)

*Primary Examiner*—John Barlow
*Assistant Examiner*—Douglas N Washburn
(74) *Attorney, Agent, or Firm*—Oliff & Berridge, PLC

(57) ABSTRACT

There is disclosed an apparatus for supporting evaluation of usability of an instrument relative to performing a given task. During performing of the task, a control unit acquires information of an operation log related to an operation performed by a user, and evaluates an effectiveness index associated with achievement of the task, efficiency index associated with efficiency, and satisfaction index associated with subjective satisfaction of the user. The indexes are generated by a statistical calculation using a plurality of measured items, including the operation log information.

9 Claims, 9 Drawing Sheets

OTHER PUBLICATIONS

Herman, L; "Towards Effective Usability Evaluation in Asia:Cross–Cultural Differences"; 6th Austrailia Conference on Computer–Human Interaction; Nov. 24–27, 1996; pp 135–136.*

Matera, M; Costabile, M; Garzotto, F; Paolini, P; "Sue Inspection: An Effective Method For Systematic Usability Evaluation of Hypermedia"; IEEE Transactions on Systems, Man and Cybernetics, Part A; vol. 32, issu 1; Jan. 2002; pp 93–103.*

Chang, E; Dillon, T; Cook, D; "An Intelligent System Based Usability Evaluation Metric"; Proceedings Intellige Information Systems; Dec. 8–10, 1997; pp 218–226.*

Oppermann, Reinhard et al. "Software evaluation using the 9241 evaluator." *Behavior and Information Technology* 1997 vol. 16, No. 4/5 pp. 232–245.

Yamoaka, Toshiki et al. "Structured User Interface Design and Evaluation– 32 points for creating an easy–to–understand Operating screen." *Research Institute of Human Engineering . . . SIDE Demonstration Working Group*, 2000.

* cited by examiner

|  | OPERATION TIME (SECOND) | ACHIEVED SITUATION | NUMBER OF CLICKS (TIMES) |
|---|---|---|---|
| TEST SUBJECT 1 | 300 | INCORRECT ANSWER | 16 |
| TEST SUBJECT 2 | 500 | CORRECT ANSWER | 12 |
| TEST SUBJECT 3 | 500 | CORRECT ANSWER | 8 |
| TEST SUBJECT 4 | 250 | CORRECT ANSWER | 8 |
| TEST SUBJECT 5 | 600 | INCORRECT ANSWER | 20 |
| TEST SUBJECT 6 | 400 | CORRECT ANSWER | 8 |
| TEST SUBJECT 7 | 350 | CORRECT ANSWER | 8 |
| TEST SUBJECT 8 | 650 | INCORRECT ANSWER | 15 |
| TEST SUBJECT 9 | 700 | INCORRECT ANSWER | 14 |
| TEST SUBJECT 10 | 500 | CORRECT ANSWER | 10 |
| ⋮ | ⋮ | ⋮ | ⋮ |
| AVERAGE | 475 | ( 60% ) | 11.9 |
| ERROR | 23 | — | 2.9 |

FIG. 8

USABILITY EVALUATION SUPPORT APPARATUS

BACKGROUND OF THE INVENTION

1. Field of the Invention

The present invention relates to an apparatus for supporting evaluation of usability related to an operation with respect to a device or instrument which receives a user input and presents at least visual information in accordance with a content of the operation. An example of such an instrument would be a device that includes a graphical user interface (GUI).

2. Description of the Related Art

Instruments which present visual information related to user operation in order to supply various information, such as an instrument state and predetermined calculation result, to a user have become common and widespread. Examples of such instruments commonly found in most offices include copying machines, computers, and air conditioners. For example, most modern copying machines include a panel for setting the number of copies to be made and various copying functions (double-sided copying and reduction/enlargement), and a user operates the instrument based on the supplied visual information. Here, the visual information presented is not limited to dynamic information displayed on a liquid crystal display (LCD) such as information indicating the number of copies requested, but includes printed and fixed information, such as, for example, numerals "1", "2", . . . printed on a ten key keypad disposed for setting the number of copies to be made in the copying machine.

As instrument functionality has grown more sophisticated, operations have increasingly become complicated. International efforts have been made to facilitate improvement of instruments by providing indexes for evaluating the usability of instruments, such as user-friendliness of using the instrument, effectiveness of use of the instrument, efficiency, and satisfaction given to a user of the instrument. For example, the ISO 9241-11 standard (Ergonomic requirements for office work with visual display terminals (VDTs)-Part 11: Guidance on usability) defines evaluation measures related to usability from the viewpoints of effectiveness, efficiency, and satisfaction, and device usability can be enhanced through such evaluation. Here, usability indicates the degree of effectiveness, efficiency, and user satisfaction in achieving a designated object under designated circumstances of a certain product by a designated user. The effectiveness indicates accuracy and completeness in achieving a designated result, efficiency measures the amount of resources consumed in association with the accuracy and completeness in achieving the target by the user, and satisfaction measures comfort and acceptability for a user who uses a computer system and the computer system, that is, the degree to which a user is free from frustration and is able to maintain a positive attitude toward product use.

Known methods of performing evaluation of a task using information from users who have completed the relevant task include questionnaires in which users independently read and answer questions and interviews where users are asked questions and provide answers to evaluators. With a questionnaire, although a specific event at a task achieving time or an entire impression at a task end time can be better understood, a relationship between the operation content and problem is often unclear, and it is often difficult to use the information to improve the device.

There are known apparatuses for recording a user operation log and diagrammatically displaying the log record to facilitate analysis (e.g., Japanese Patent Application Laid-Open No. 8-153022). Moreover, there are techniques for recording and reproducing the operation log between the system, which is an evaluation object, and the user and listing and displaying the state log of the system (e.g., Japanese Patent Application Laid-Open No. 2001-51876).

Furthermore, there is another related art system in which user testing is employed. In user testing, a test subject regarded as a user actually operates the instrument, a test subject which attempting to perform a task is observed by an observer, the observer presumes what the test subject is going to do, and the observer notes steps at which the usability drops.

For example, when it is observed that the test subject's eyeshot moves over an operation panel, it is presumed that the test subject is searching the panel for information or a means to input a desired command. When this takes an excessively long amount of time, it is presumed that the operation of the panel is not clear and the panel design is not efficient for operation, and therefore the usability of such a panel is low.

However, in these related-art methods of evaluating usability, an evaluator must refer to records of the operation log, state log of the system, and test subject's state to conduct the evaluation. Therefore, evaluator's arbitrary judgment is easily included, and the final results tend to depend on the individual knowledge of each evaluator.

When there are a plurality of evaluators, particularly when there are many evaluation objects, uniform evaluation is not easily obtained, and the criteria or components to be improved are not easily distinguished. Moreover, to obtain the questionnaire or interview information from the test subject, only the content that the test subject is aware of can be extracted. Therefore, there is a large possibility that a test subject will unconsciously edit their thoughts or comments in order to describe the state after the end of the operation. Furthermore, with the known usability evaluation methods it is not always possible to obtain indexes of the usability such as effectiveness, efficiency, and satisfaction, which conform with the ISO 9241-11 standard.

Additionally, even if such indexes as effectiveness, efficiency, and satisfaction are obtained, because the content or definition of the index differs for different types of business, it is difficult to standardize evaluation. Moreover, effectiveness, efficiency, and satisfaction can be defined in each situation of use of the evaluation object. Therefore, when effectiveness, efficiency, and satisfaction data are not obtained according to the same definitions among the objects to be compared/evaluated, the meaning of quantification and evaluation is weakened. Additionally, there has been a demand for an ability to evaluate individual components of a task to evaluate their negative effect on the overall usability so that the specific components can be improved. Therefore, the burden on evaluators is heavy, and extensive training of evaluators is necessary.

SUMMARY OF THE INVENTION

The present invention was developed in consideration of the above-described circumstances, and provides an apparatus for supporting evaluation of usability so that usability can be easily and efficiently evaluated in consideration of circumstances regarding individual businesses in a mode suitable for evaluation conforming to ISO standards.

According to one aspect of the present invention, there is provided an apparatus for supporting evaluation of usability in achieving a given task with respect to an instrument including a display unit for displaying information, the apparatus comprising means for acquiring information of an operation log which is related to an operation performed by a user and which includes at least one item of operation log data collected during performance of the task; and index evaluation means for generating at least one effectiveness index related to accuracy and completeness in achieving a target of the task, efficiency index related to a resource consumed in association with the accuracy and completeness in achieving the target of the task, and satisfaction index related to satisfaction of a task achiever in achieving the target of the task. The index evaluation means evaluates and generates the effectiveness, efficiency, and satisfaction indexes using a statistical calculation involving at least one data included in at least one of a plurality of measurement items including the operation log information.

Moreover, the apparatus may further comprise means for acquiring at least one item of user biometric data (data related to the user as a living being), and the index evaluation means may also preferably evaluate the effectiveness, efficiency, and satisfaction indexes using a statistical calculation involving at least one item of data included in at least one of a plurality of measurement items including the information of the operation log and the information on the living organism. Furthermore, the apparatus further comprises means for acquiring satisfaction evaluation of the user concerning the achieving of the task, and the index evaluation means also preferably evaluates the effectiveness, efficiency, and satisfaction indexes of each subtask using at least one data item included in a plurality of measurement items related to the satisfaction evaluation. Here, the means for acquiring the satisfaction evaluation may be means for inputting a result of questionnaire or interview, or means for inputting biometric data of the user.

Furthermore, the apparatus preferably comprises means for performing a predetermined statistical calculation in order to generate each effectiveness evaluation result, efficiency evaluation result, and satisfaction evaluation result based on at least one effectiveness index, efficiency index, and satisfaction index generated by the index evaluation means.

Moreover, in the aspect of the present invention, the content of the statistical calculation in evaluating the effectiveness, efficiency, and satisfaction indexes in the index evaluation means can be changed. Furthermore, the content of the predetermined statistical calculation for generating the effectiveness, efficiency, and satisfaction evaluation results can be changed. Ability to change, alter, or customize the content of the statistical calculation can be changed in this manner enables the evaluation to be set, modified, or customized according to the specific circumstances of a particular business.

According to another aspect of the present invention, there is provided a method for supporting evaluation of usability in achieving a given task with respect to an instrument including a display unit for displaying information, the method comprising a step of acquiring information of an operation log which is related to an operation performed by a user and which includes at least one data of the operation log during the achieving of the task; and an index evaluation step of generating an effectiveness index related to accuracy and completeness in achieving a target of the task, an efficiency index related to a resource consumed in association with the accuracy and completeness in achieving the target of the task, and a satisfaction index related to satisfaction of a task achiever in achieving the target of the task. The index evaluation step comprises a steps of evaluating and generating the effectiveness, efficiency, and satisfaction indexes using a statistical calculation performed on at least one data item included in at least one of a plurality of measured items, including the operation log information.

Here, the method further comprises a step of generating an effectiveness evaluation result, an efficiency evaluation result, and/or a satisfaction evaluation result based on at least one effectiveness index, efficiency index, and satisfaction index generated by the index evaluation step, using a predetermined statistical calculation.

According to further aspect of the present invention, there is provided a program which supports evaluation of usability in achieving a given task with respect to an instrument including a display unit for displaying information and which enables a computer to perform a procedure of acquiring information of an operation log related to an operation performed by a user and including at least one data of the operation log during the achieving of the task; and an index evaluation procedure of generating at least one effectiveness index related to accuracy and completeness in achieving a target of the task, efficiency index related to a resource consumed in association with the accuracy and completeness in achieving the target of the task, and satisfaction index related to satisfaction of a task achiever in achieving the target of the task. The index evaluation procedure comprises a step of performing a statistical calculation evaluating and generating the effectiveness, efficiency, and satisfaction indexes using at least one data item included in at least one of a plurality of measurement items including the operation log information.

Here, the computer is preferably caused to further execute a procedure of generating effectiveness evaluation results, efficiency evaluation results, and satisfaction evaluation results based on at least one effectiveness index, efficiency index, and satisfaction index generated by the index evaluation procedure using a predetermined statistical calculation.

BRIEF DESCRIPTION OF THE DRAWINGS

FIGS. 8–13 are explanatory views showing examples of presentation of evaluation results.

DESCRIPTION OF THE PREFERRED EMBODIMENT

Figure 1:
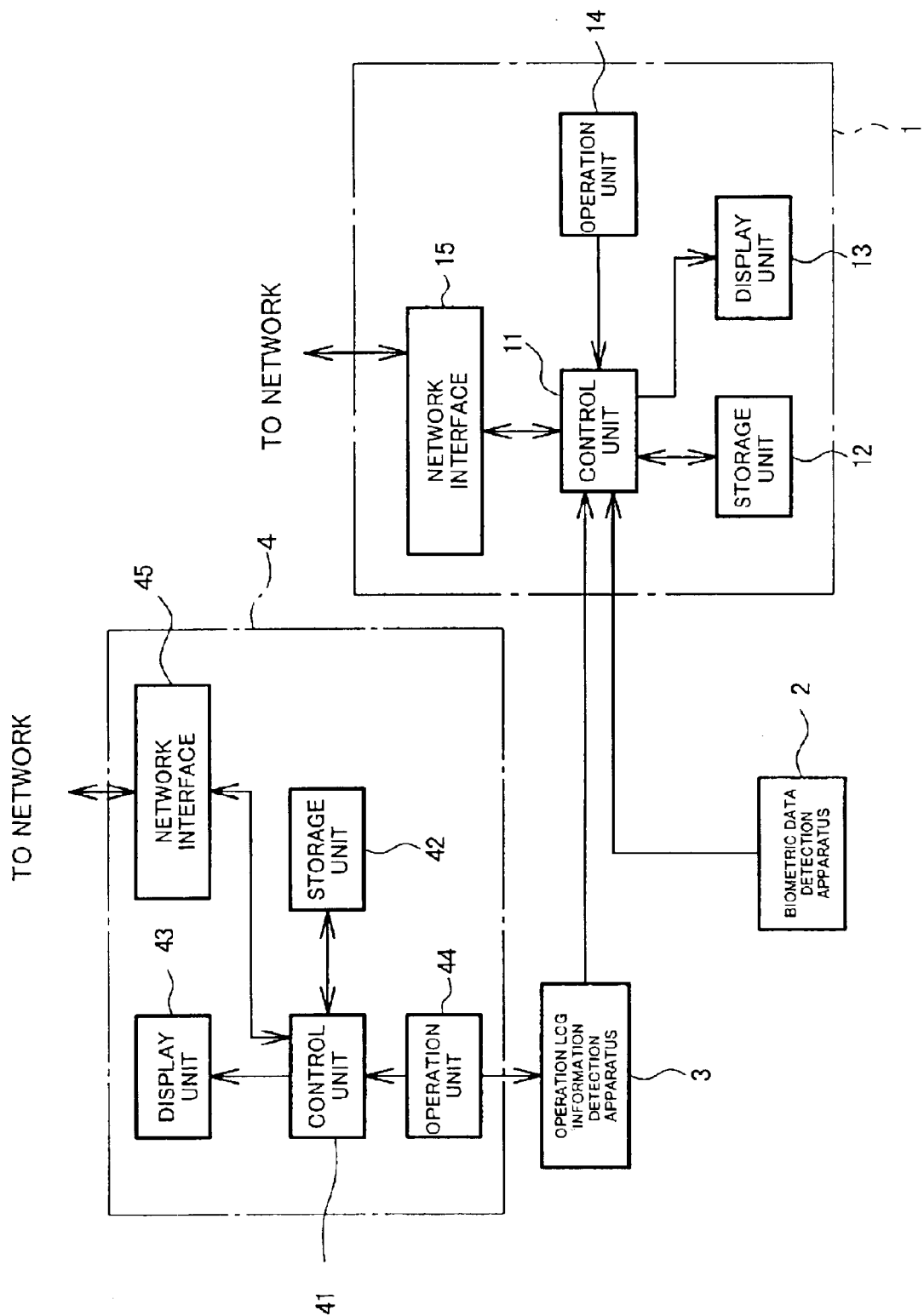
FIG. 1 is a block diagram showing the constitution of a usability evaluation support apparatus according to an embodiment of the present invention.

A preferred embodiment of the present invention will be described with reference to the drawings. As shown in FIG. 1, a usability evaluation support apparatus 1 according to the present embodiment is a conventional computer including a control unit 11, storage unit 12, display unit 13, operation unit 14, and network interface 15. Moreover, the usability evaluation support apparatus 1 is connected to a biometric data detection apparatus 2 for detecting biometric data, operation log information detection apparatus 3, and a user-operated apparatus 4 including a display apparatus. The apparatus 4 additionally comprises a control unit 41, storage unit 42, display unit 43, operation unit 44, and network interface 45.

The control unit 11 of the usability evaluation support apparatus 1 operates in accordance with a program stored in the storage unit 12, and executes usability evaluation support processing. This usability evaluation support processing will be described in detail below. Examples of the storage unit 12 includes computer readable reading media such as a hard disk and CD-ROM, and storage devices such as a random access memory (RAM) and read only memory (ROM), and the program to be processed by the control unit 11 is stored in the computer readable recording medium. Moreover, the storage unit 12 also operates as a work memory of the control unit 11.

The display unit 13 including a display displays information in accordance with an instruction input from the control unit 11. The operation unit 14 including a keyboard and/or mouse (pointing device) outputs the content of an evaluator' operation to the control unit 11. The network interface 15 is connected to a network, and transmits data via the network in accordance with the instruction input from the control unit 11. Moreover, the network interface 15 receives data coming via the network, and outputs the data to the control unit 11.

The biometric data detection apparatus 2 acquires biometric information concerning a user, and outputs biometric data to the control unit 11. Examples of biometric data which may be acquired here include direction and movement distance of the user's eyes, speed of movement, fixation time, noted order, size of pupil, perspiration amount, pulse rate, heart rate, and electroencephalogram patterns. In the following description, the biometric data detection apparatus 2 is an apparatus for detecting user eye focus in one example, and may be, for example, a well known apparatus which can be attached to the user's head and captures an image viewed by the user to detect the focal point of the user's eyes from the captured image.

The operation log information detection apparatus 3 is connected to the operation unit 44 of the apparatus 4, and records in the operation unit 44 the content of the operations performed by the user as operation log data. In response to an instruction, the apparatus outputs the recorded data to the usability evaluation support apparatus 1.

The control unit 41 of the apparatus 4 operates in accordance with the program stored in the storage unit 42; executing a predetermined processing in accordance with the user's instruction input via the operation unit 44; and displaying information to be presented to the user according to processing in the display unit 43. The storage unit 42 may include computer readable media such as a hard disc or a CD-ROM, and storage devices such as RAM and ROM, and the program to be processed by the control unit 41 is stored in the computer readable recording medium. Moreover, the storage unit 42 also operates as a work memory of the control unit 41.

The display unit 43 including the display displays the information in accordance with instructions input via the control unit 41. The operation unit 44 including the keyboard and/or mouse (pointing device) outputs the content of the evaluator's operation to the control unit 41. Moreover, the operation unit 44 is connected to the operation log information detection apparatus 3, and outputs the content of the operation to the operation log information detection apparatus 3. The network interface 45 is connected to the network, and transmits the data via the network in accordance with instructions input via the control unit 41. Moreover, the network interface 45 receives data coming via the network, and outputs the data to the control unit 41.

The apparatus 4 is a dialog terminal which responds to the user operations and displays information accordingly, for use by a user to perform a given task. For example, the user may execute a task of operating the operation unit 44 and accessing a website to perform online shopping, or using table calculation application to draw a graph and display the graph on the display unit 43.

[Usability Evaluation Support Processing]

Figure 2:
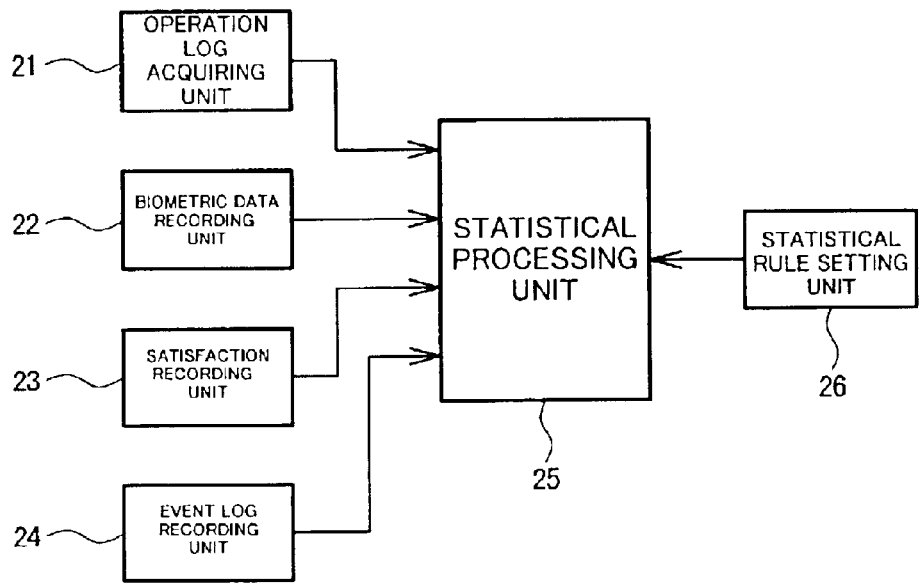
FIG. 2 is a function block diagram showing a usability evaluation support program.

Here, evaluation support processing of the usability of the control unit 11 will be described. In the present embodiment, evaluation of the usability is performed using records of an operation log, biometric data, and satisfaction information with respect to a user. More specifically, as shown in FIG. 2, a program for evaluation processing of the usability stored in the storage unit 12 includes an operation log acquiring unit 21, biometric data recording unit 22, satisfaction recording unit 23, event log recording unit 24, statistical processing unit 25, and statistical rule setting unit 26.

The operation log acquiring unit 21 acquires operation log data recorded in the operation log information detection apparatus 3 and successively stores the data in the storage unit 12 in association with the operation in the operation unit 44. Examples of such data include coordinate information of position of a pointer (e.g., arrow) displayed on the display unit 43 in cooperation with the mouse, number of clicks, the number of keystrokes, and the like. These various types of operation log data will herein be referred to as "operation log information".

The biometric data recording unit 22 successively stores in the storage unit 12 data indicating a position on the display unit 43 viewed by the user during the achieving of the task (position of a focal point) based on eye direction data input via the biometric data detection apparatus 2. Here, the stored data of the position of the focal point is recorded, for example, as coordinate information on the display unit 43.

Figure 3:
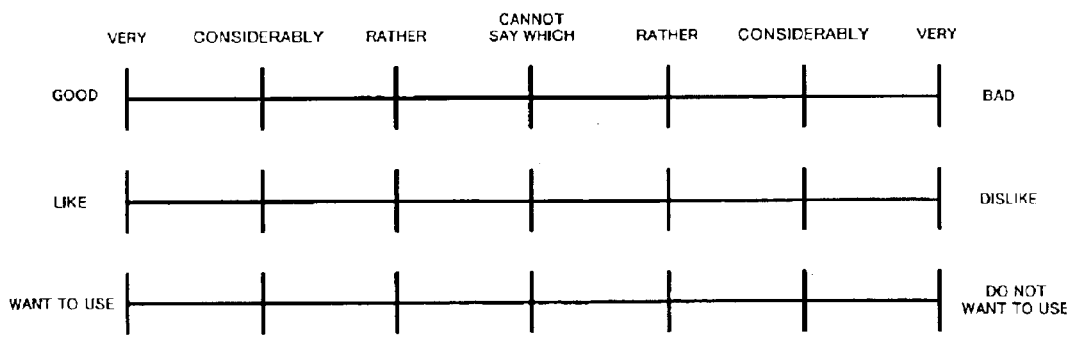
FIG. 3 is an explanatory view showing one example of a questionnaire.

For example, as shown in FIG. 3, the satisfaction recording unit 23 allows the user to evaluate factors such as a cognitive tendency of attitude "good-bad", behavior tendency "want to use—do not want to use", and emotional tendency "like-dislike" using graded scales. The unit receives input rating information via the operation unit 14, and stores the rating results in the storage unit 12 as satisfaction data. Moreover, the satisfaction recording unit 23 preferably checks changes in the pupil diameter using the biometric data detection apparatus 2, and stores in the storage unit 12 pupil diameter data in terms of a ratio to a standard diameter for that user's pupils (diameter in referring to the brightness nearly equal to that of the environment in which the task is achieved) as satisfaction data. In human beings, pupil diameter tends to increase when a person experiences a pleasant feeling, and to decrease when a person experiences an unpleasant feeling. Therefore, from the results of the comparison, how a user is feeling when performing a task can be measured. In this manner, user satisfaction can be estimated using not only questionnaires or interviews, but also biometric data obtained from the user who is performing the task. Satisfaction information including at least one item of satisfaction data is statistically processed later, and used in calculating an index of user satisfaction. More specifically, graded evaluation of images such as "like-dislike" is processed by a way of thinking such as a so-called semantic differential (SD) method.

The event log recording unit 24 stores uniform resource locator (URL) information indicating processing performed by the control unit 41 in association with a user task such as display of help information on the display unit 43 and display of webpages, information indicating that a screen has moved, information acquired with error occurrence, and event information (the number of displays or occurrences or time required in the processing) indicating whether or not the user has achieved the task (or a part of the task) into the storage unit 12.

It is to be noted that for the information indicating whether or not the user has achieved the task (or a part of the task) as described above, event information set as an achieving condition is obtained and it can then be judged that the task has been "achieved". For example, when the task involves online shopping accessing a website, and when there a URL of an online shopping completion confirmation screen presented at completion of the online shopping process is accessed, it is judged that the task has been successfully completed. Similarly, with input of a payment recipient as a component of the task of online shopping, the confirmation screen webpage is accessed, and it can then be judged that that part of the task has been achieved. Moreover, as in the example of the online shopping, for the task achieved while continuously transferring among a plurality of webpages, achieving conditions can be determined using conditions of the following information. The information includes a transfer destination page to be finally reached, transfer destination contents, link clicked as a transfer destination, URLs of a plurality of pages to be transferred, order of URLs of the pages to be transferred, and input information in the middle of task achieving or final stage of page transfer. Similarly, when the information is input by a user using a keyboard, and when the input information is compared with correct information to be input, a right/wrong ratio is calculated, which may also be used as an index of effectiveness.

The statistical processing unit 25 uses at least one item of operation log data included in the operation log information stored in the storage unit 12, at least one item of biometric data, at least one item of satisfaction data included in satisfaction information, or record of an event to generate at least one index of effectiveness, efficiency, and satisfaction in accordance with a statistical rule for index calculation set by the statistical rule setting unit 26. Moreover, the statistical processing unit 25 performs statistical processing with respect to the generated index in accordance with the statistical rule for evaluation result set by the statistical rule setting unit 26. The unit calculates and outputs each evaluation result of effectiveness, efficiency, and satisfaction corresponding to the generated index. Concretely, as shown in Table 1, the indexes generated by the statistical processing unit 25 are the indexes of the effectiveness, efficiency, and satisfaction. For effectiveness, an index which indicates accuracy or completeness in achieving a given target is generated and employed. For efficiency, an index concerning the amount of resources consumed in relation to the accuracy or completeness of a user's achievement of the target is generated and employed. For satisfaction, an index concerning user satisfaction is generated and employed. The index can be represented, for example, by a numeric value or character string.

TABLE 1

| Presented Index | Content |
|---|---|
| Effectiveness | Accuracy or completeness for user to achieve designated target as measured by the following: <br> 1. number of errors occurred during task execution or by task end; <br> 2. ratio of cases in which task operation reaches a predetermined state to all cases; <br> 1. ratio of predetermined number of transfer steps to actual number of steps in case in which task operation reaches predetermined state; <br> 2. number of instances in which help is required in order to achieve task |
| Efficiency | Amount of resources consumed in relation to accuracy and completeness for user to achieve target as measured by the following: <br> 1. time required for achieving task (time required for achieving task = response display waiting time + time required for interpreting displayed information + time required for operation); <br> 2. number of clicks of pointing device required for achieving task; <br> 3. movement amount of pointing device required for achieving task (amount of scrolling or pointing device travel); <br> 4. input information amount required for achieving task (number of keyboard strokes); <br> 5. number of instances of reference to an electronic manual required for achieving task; <br> 6. screen transfer amount required for achieving task (number of transfer pages); <br> 7. response time for screen display required for achieving task; <br> 8. content amount in screen page required for achieving task (text amount/page constituting pixel amount/color number/image size and image frame number); and <br> 9. biometric data (eye movement amount/perspiration amount/difference of pulse rates before and during operation/amount of blinking. |
| Satisfaction | User subjective satisfaction as measured by the following: <br> 1. Satisfaction is evaluated on three scales including cognitive tendency of attitude (good/bad), behavior tendency (want to use/do not want to use), and emotional tendency (like-dislike) by SD method. <br> 2. Ratio or difference between reference value and value at task execution time by biometric data ($\alpha$ wave amount by electroencephalogram/evaluation by ESAM/pupil diameter/perspiration amount) |

The statistical rule used by the statistical processing unit 25 includes a statistical rule (first rule) for index calculation, and a statistical rule (second rule) for evaluation results as described above. The first rule indicates a degree of contribution of data included in operation log information stored in the storage unit 12, data included in biometric data, and data included in satisfaction information to the calculation of the indexes. For example, the statistical processing unit 25 uses a set of weights $w_i$ corresponding to a value $E_i$ ($i=1, 2, \ldots$) of each data concerning the index of effectiveness as the first rule to calculate an index of effectiveness Veff as follows.

$$Veff = \Sigma w_i \cdot E_i \quad \text{[Equation 1]}$$

Moreover, the indexes of the efficiency and satisfaction can also be calculated by similar processing. Each $w_i$ may also be normalized so as to obtain $\Sigma w_i = 1$.

The second rule used by the statistical processing unit 25 indicates the degree of contribution of at least one of the generated effectiveness, efficiency, and satisfaction indexes to the evaluation result for each index. For example, a set of weight vi corresponding to each index Ni (i=1, 2, . . . ) concerning the evaluation result of effectiveness is set as the second rule, and the statistical processing unit 25 calculates an evaluation result of effectiveness Seff as follows.

$$Seff = \Sigma vi \cdot Ni \quad \text{[Equation 2]}$$

Moreover, the evaluation results corresponding to the indexes of the efficiency and satisfaction are also calculated by similar processing. Also in this case, each vi may also be normalized so as to obtain $\Sigma vi=1$.

The statistical rule setting unit 26 stores these statistical rules in the storage unit 12 in accordance with instructions input from the operation unit 14. In this manner, in the present embodiment, because the statistical processing content can be changed, onsite evaluation specific to the circumstances of a particular business can be performed. For example, to measure the efficiency by economical efficiency, weights such as time required for the task with respect to the record (data) related to cost are enlarged. To measure the efficiency by the load on apparatus hardware, the weight with respect to displayed information amount (text amount/ page constituting pixel amount/color number) may be enlarged and set.

The program of the present embodiment includes the above-described functional components. Therefore, the usability evaluation support apparatus of the present embodiment operates as follows. When a user (test subject) performs a given task using the apparatus 4, the data showing the log of operations performed by the user via the operation unit 44 while performing the task is stored in the operation log information detection apparatus 3.

The control unit 11 of the usability evaluation support apparatus 1 acquires this data and stores the acquired data in the storage unit 12. Moreover, the data related to the user's biometric data detected by the biometric data detection apparatus 2 during the achieving of the task is successively stored in the storage unit 12. Furthermore, the control unit 11 successively stores in the storage unit 12 event information generated as the user performs the specific task. The record is performed in a way that the time relation is known. That is, for example, the data included in each operation log information, biometric data, and event information may be recorded together with their acquisition (generation) time information.

After completion of the task, the control unit 11 displays on the display unit 13 a diagram as shown in FIG. 3 for acquiring satisfaction information, obtains user answers, and stores obtained information in the storage unit 12 as satisfaction data. Furthermore, the satisfaction data may also include biometric data (e.g., pupil diameter) related to the user detected by the biometric data detection apparatus 2.

The control unit 11 uses at least one data item included in the operation log information, biometric data, event information, and satisfaction information stored in the storage unit 12 to calculate the indexes of effectiveness, efficiency, and satisfaction in accordance with the statistical rule (first rule) set beforehand by the statistical rule setting unit 26 as the processing of the statistical processing unit 25. The results are stored in the storage unit 12.

Furthermore, the control unit 11 calculates the evaluation result for each index in accordance with the statistical rule (second rule) and stores the result in the storage unit 12. The calculation and evaluation results of the respective indexes are presented to the display unit 13 in accordance with an evaluator's instruction, and used for evaluation of usability as defined in the ISO standards.

[Division of Record]

The statistical processing unit 25 divides the recorded data included in the operation log information, biometric data, and satisfaction information stored in the storage unit 12 for each subtask included in the task. The index of the usability for each subtask (effectiveness, efficiency, and satisfaction) may also be calculated based on the divided recorded data.

Figure 4:
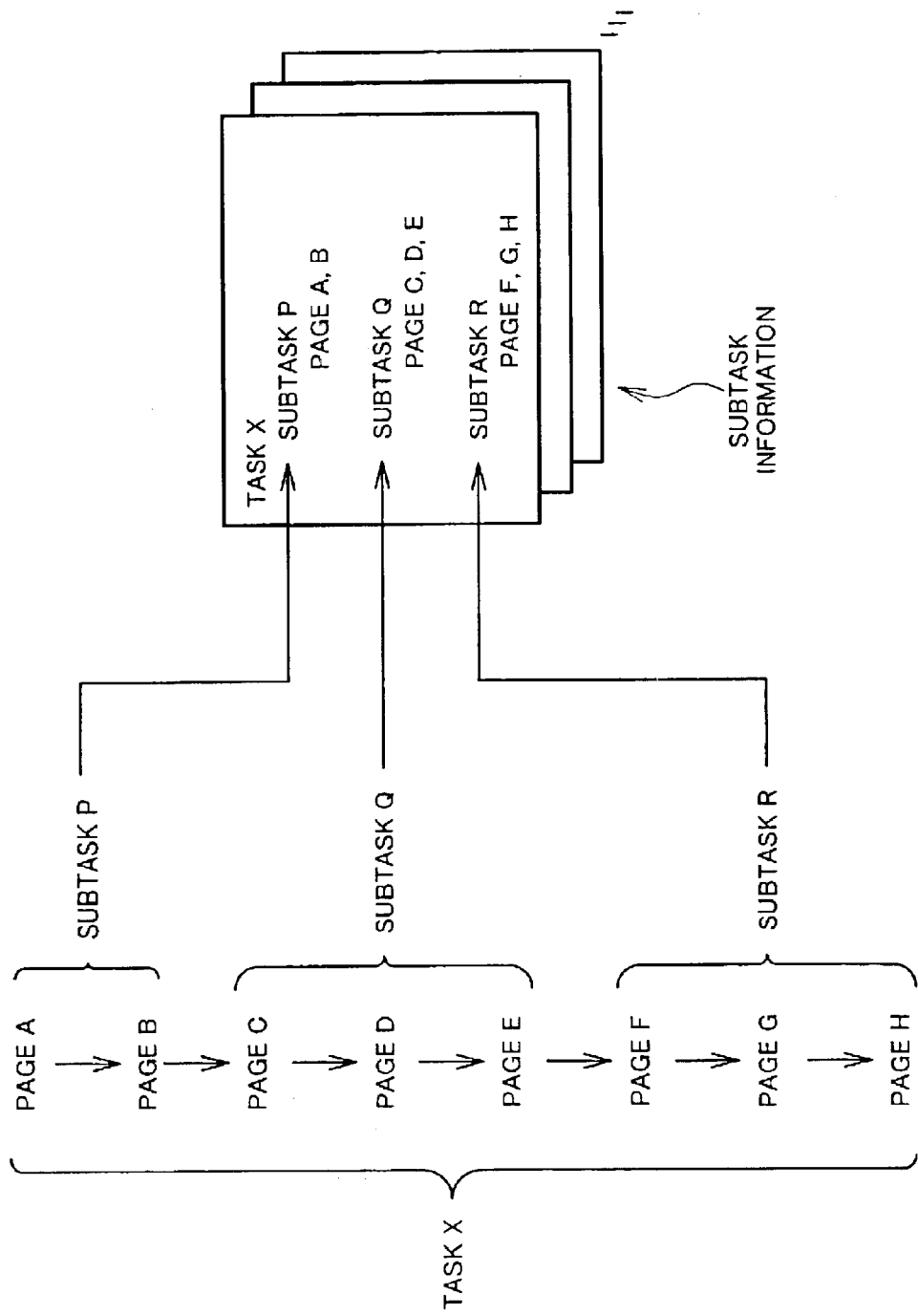
FIG. 4 is an explanatory view showing one example of definition of a subtask.

Concretely, as shown in FIG. 4, with respect to each task, information which defines divisions of subtasks is associated to form subtask information, the information is stored in the storage unit 12, and the statistical processing unit 25 refers to the information to divide each record.

Figure 5:
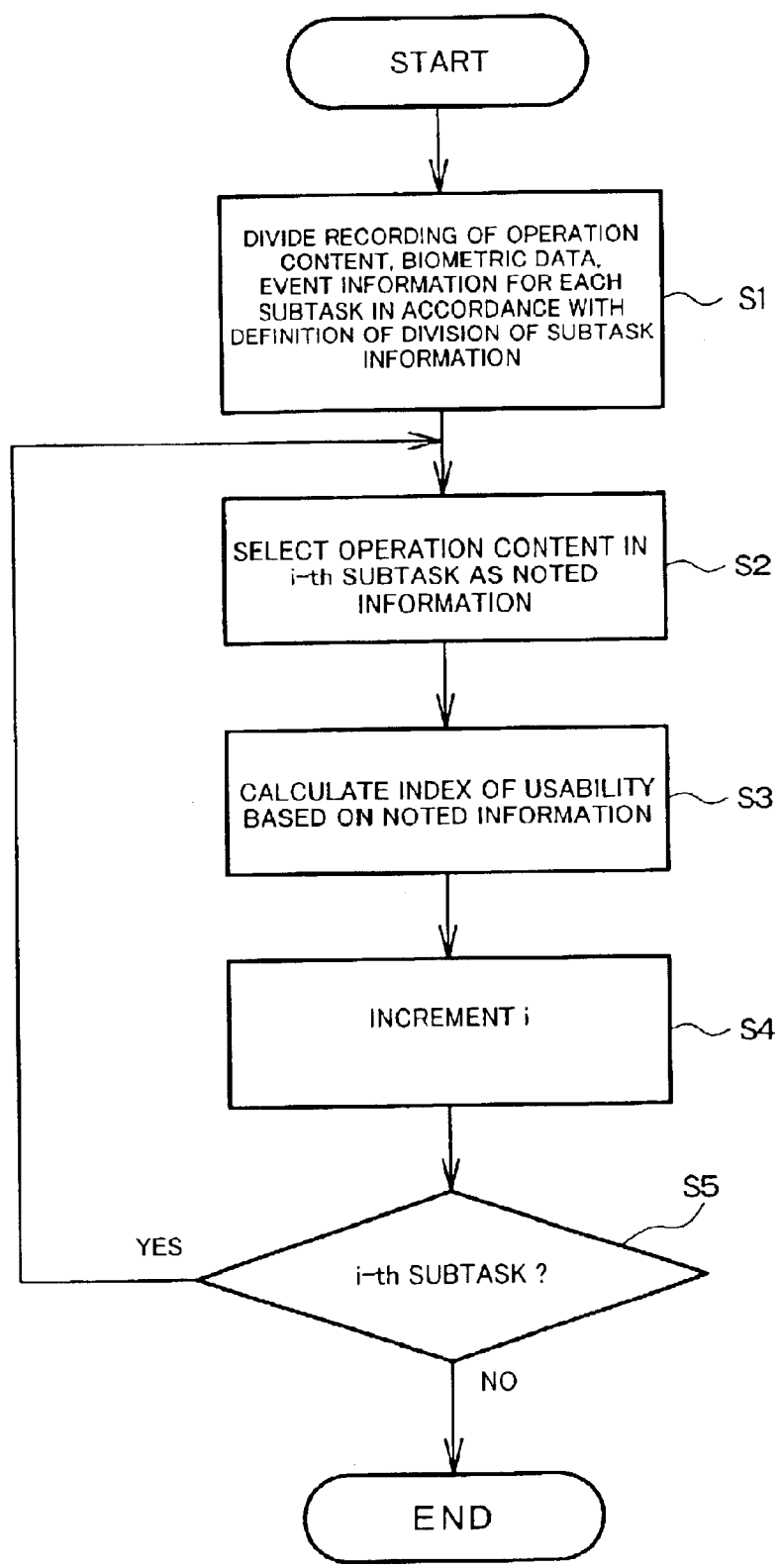
FIG. 5 is a flowchart showing a processing of usability evaluation support with respect to a subtask.

Subsequently, the control unit 11 records the content of the operation, biometric data, and event information in such a manner that time relation of the information can be understood. The unit executes the processing of the statistical processing unit 25 as shown in FIG. 5, refers to the subtask information stored in the storage unit 12 in association with the task being achieved by the user, and divides the record of data included in the operation log information, biometric data, satisfaction information, and event information in accordance with the division definition of the subtask (S1). Subsequently, the unit selects data recorded in i-th (first i=1) subtask as noted data (S2), uses the selected data to similarly calculate the index of the usability (effectiveness, efficiency, and satisfaction) as described above, and stores the index in the storage unit 12 (S3). Moreover, the unit increments (increases) i (S4), and judges whether or not there is an i-th subtask (S5). When it is judged that there is a subtask, the processing returns to step S2, and is continued. Moreover, when there is no i-th subtask in the step S5 (when the processing is completed with respect to all the subtasks), the processing is ended. By the processing of the control unit 11, the index of the usability for each subtask is calculated.

The operation of the control unit 11 for use, for example, in the evaluation of the usability will be described in achieving the task while successively accessing a plurality of webpages on a website. In this example, the subtask can be defined in accordance with the accessed URL for the webpage. That is, when eight webpages A to H are accessed to achieve the task as shown in FIG. 4, a subtask P operated by accessing the webpages A, B, subtask Q operated by accessing the webpages C to E, and subtask R operated by accessing the webpages F to H are defined.

Subsequently, the control unit 11 divides the record of the data included in the operation log information, biometric data, satisfaction information, and event information at the actual achieving time of the task by the user into records. The records include a record before the time webpage C was accessed (time of change to the subtask Q from P), and a record between the time webpage C and was accessed the time of webpage F was accessed (time of change to the subtask R from Q), and a record after the time of webpage F was accessed. In this case, for accumulated measured values during the achieving of the task, the control unit 11 determines a value up to the division point. For example, when the data of operation time is recorded, recording time of the event information during the change of the subtask (the event information at the opening time of the webpage C in the above-described example) is used to determine and record the operation time of each subtask.

After the user completes the task, the control unit 11 may present a questionnaire to the user, and record the answers input by the user as questionnaire data.

Subsequently, the record of the data of the satisfaction information including the questionnaire data, operation log information divided for each subtask, biometric data, and event information is used to calculate the index of the usability for each subtask. It is to be noted that there is also a task which cannot be divided into the subtasks. In this case, it is assumed that the record is not divided.

[Further Use of Biometric Data]

The control unit 11 uses various biometric data to estimate the state (consistent with the user's satisfaction) during performance of the task by the user, and may generate the corresponding evaluation. To estimate the user's state using this biometric data, when the record is divided as described above and the evaluation is generated for each subtask, the state of each subtask being achieved may be estimated for each subtask.

Figure 6:
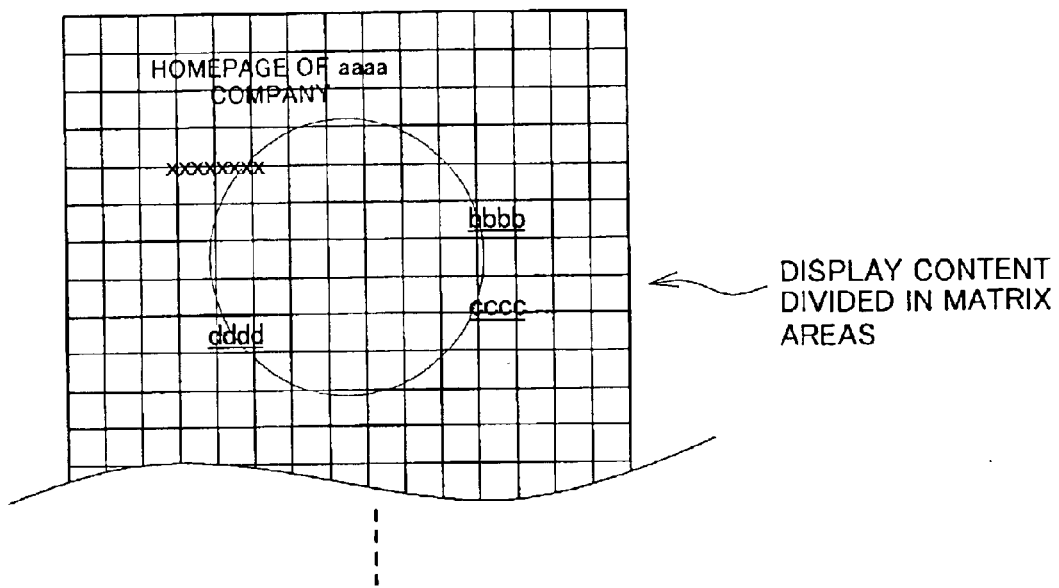
FIG. 6 is an explanatory view concerning an example of processing using focal point information as biometric data.

Concretely, the operation of the control unit 11 which uses focal point information stored as the biometric data in the storage unit 12 to estimate the user's psychological state will be described. In this case, the evaluator selects a display content (e.g., webpage) which is an object of evaluation from display contents to be displayed in the task (or the subtask) which is the object of the evaluation. Subsequently, the selected display content is divided into N×M (N, M are integers) matrix areas as shown in FIG. 6.

Subsequently, the control unit 11 measures a time for which a focal point is present in each area. Thereby, a position watched by the user for a longer time is measured.

Moreover, for each area the control unit 11 counts the number of eye movements in the area. Concretely, when the focal point moves into a certain area (noted area), the control unit 11 begins counting the number of movements of the focal point into the noted area with "1". Next, when the user moves the focal point to another area and moves the focal point into the noted area again, a counted value is incremented to "2". Thereafter, every time the user switches focus to another area and again returns their focus to the noted area, the counted value is incremented. Similarly, the control unit 11 counts the total number of areas on which the user's focuses at least once. Thereby, the content displayed in the display unit 13 on which the user's focus is most concentrated is measured.

Furthermore, the control unit 11 refers to data on the change of movement of the focal point over time to generate information indicating the order of user focal point movement on each area.

Figure 7:
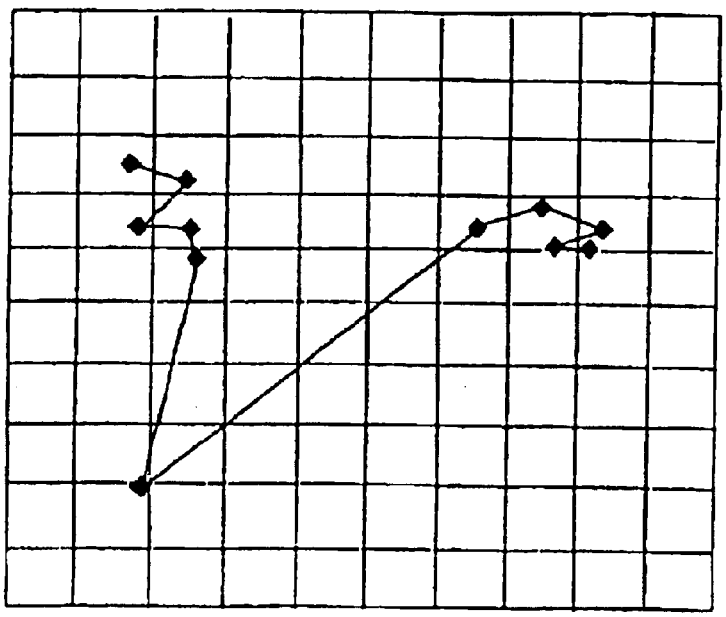
FIG. 7 is an explanatory view showing an example in which a state of eye movement is displayed.

Through this processing, the control unit 11 generates information concerning the time, frequency, and order of the user who watches each area. It is to be noted that the evaluator may display on the display unit 13 this information together with the display content (webpage) which is the object of measurement. For example, information indicating the order of the focal point movement may be displayed in the mode shown in FIG. 7. Here, any one of information concerning the time, frequency, and order is selectively displayed, and controlled not to be superposed in the display, so that clarity of a screen for evaluation is improved.

The control unit 11 analyzes the information concerning the time, frequency, and order of the user who views each area, measured and generated for each area, and judges four conditions for each area. The conditions include whether or not the user watches the area longer than a predetermined time (condition concerning browsing time), whether or not the user watches the area more than predetermined times (condition concerning the number of browsing operations), whether or not the focal point movement among the areas is performed in a time shorter than the predetermined time (ahead of the time) (condition concerning browsing order), and whether the total number of areas receiving the focal point even once is more than a predetermined threshold value (condition concerning the number of browsing areas). The unit generates information for estimating the user's state and character string information concerning the evaluation based on these conditions. Concretely, the respective conditions are associated with the information of presumption/evaluation of the user's state as shown in Table 2 below, and is preset in the storage unit 12.

TABLE 2

| Browsing time | Number of accesses | Browsing order | Number of browsed areas | User's psychological state | Evaluation |
|---|---|---|---|---|---|
| Long | Large | Quick | Large | Cannot determine | Cannot determine because of poor expression |
| Long | Large | Quick | Small | Comparing because unable to determine | Ambiguous expression |
| Long | Large | Slow | Large | At a loss | Inconspicuous |
| Long | Large | Slow | Small | Comparing | Ambiguous expression |
| Long | Small | Quick | Large | Browsing whole site | Associated items are not organized. |
| Long | Small | Quick | Small | Difficult to read | Size of character is poor |
| Long | Small | Slow | Large | Difficult to find | Arrangement, coloration are poor |
| Long | Small | Slow | Small | Items not easily read | There is problem in the area. |
| Short | Large | Quick | Large | Difficult to select | Portion to be displayed most is unclear. |
| Short | Large | Quick | Small | Comparing | Ambiguous expression |
| Short | Large | Slow | Large | Difficult to find | Too many candidates |
| Short | Large | Slow | Small | Difficult to find | Coloration is poor |
| Short | Small | Quick | Large | Cannot determine | Expression is poor and decision cannot be made |
| Short | Small | Quick | Small | Smooth operation | No problem |
| Short | Small | Slow | Large | Unexpected place | Layout is poor |
| Short | Small | Slow | Small | Unexpected place | Inconspicuous |

When, for example, the browsing time is long, the number of accesses is large, the focal point movement (the browsing order) is quick, and the number of browsed areas is large, it can be judged that the user "cannot determine" the operation. The display content can be evaluated with character information indicating "expression is poor, and the operation cannot be determined".

Here, only the biometric data is used to estimate the user's state to evaluate content displayed in the display unit 43. However, a characteristic amount determined in accordance with a relation between the user's operation content and focal point information may be calculated to be used to estimate the user's state. For example, a vector indicating focal point movement, and vector indicating the movement of the pointing device as the operation content are used to calculate the size of each vector, angle θ formed between the vectors, and ratio r of the sizes of the respective vectors as the characteristic amount. The user's psychological state can be estimated as follows.

(1) When the focal point and pointer are not larger than a predetermined size (do not move much), it is presumed that one point on the display unit 43 is carefully watched, and the state of "gaze" is judged.

(2) When there is not much movement of the focal point but the pointer is moving, it is presumed that the browsing of the contents in the Web page displayed in a browser is complete and that an operation for clicking the link to see non-displayed contents is performed, and state of "operation in the page" is judged.

(3) When the focal point moves, but the pointer does not move significantly, it is presumed that the content to be seen next is searched in the display unit 43, and state of "search" is judged.

(4) When there are movements of the focal point and pointer, and θ is larger than a predetermined threshold value, directionality of the pointer operation is not aligned with that of the focal point movement. Therefore, the transfer to the next Web page is estimated (the pointer moves to click the link, whereas the focal point moves to a page head portion, and therefore the pointer and focal point generally move in directions different from each other) and state of "movement operation" is judged.

(5) When the focal point or the pointer does not move, θ is smaller than the predetermined threshold value, and the ratio r of the movement amount is large, a state in which the coordinate indicated in the position of the focal point is different from the coordinate of the pointer turns to a state in which the focal point and pointer position are concentrated to point one point. It is presumed that "return" button of the browser is to be clicked, and state of "browser operation" is judged.

(6) When the focal point or pointer does not move, θ is smaller than the predetermined threshold value, and the ratio r of the movement amount is small, it is presumed that the pointer is moved and the position of the pointer is followed with the focal point, and "perusal" (content which is not easily read is being read) is judged.

[Biometric Data Other Than Focal Point Information]

As described above, by use of information other than the focal point information, for example, based on a electroencephalogram patterns, the user's feeling can be measured based on a ratio of a pre-measured user's α wave output amount at a standard time to an α wave output amount of the user who is achieving the task. Moreover, also with the use of a sensitivity spectrum analysis method (ESAM: method of Brain Function Research Institution Co., Ltd.), judgment conditions are set with respect to analysis results to estimate the user's situation, and the evaluation can be obtained in accordance with the state. Furthermore, as described above, the size of the pupil can be used to obtain satisfaction data. Additionally, the evaluation based on the evaluation is also preferably generated as character string information.

[Presentation of Evaluation Support Information]

As described above, the usability evaluation support apparatus 1 according to the present embodiment calculates the indexes of the effectiveness, efficiency, and satisfaction for the usability in accordance with ISO standards. Moreover, in the present embodiment, performance of the task which is the object of the usability evaluation is divided, and the indexes of the effectiveness, efficiency, and satisfaction are calculated for each subtask included in the task.

Furthermore, to calculate these indexes, "measured values" of the content of the operation performed by the user to achieve the task, information concerning the user's living organism during the achieving of the task, answers to the questionnaire obtained from the user, and event information generated by the apparatus 4 used at the task achieving time are used.

The evaluator usually refers to the respective indexes of the effectiveness, efficiency, and satisfaction, or uses the indexes as such to determine the evaluation result of the usability. However, in certain cases, the measured values (recorded data) directly referred to are sometimes useful for proposal of evaluation and improvement of the usability. Then, the control unit 11 performs the statistical calculation with respect to the data stored in the storage unit 12 in response to the instruction, and executes processing of displaying the statistical calculation result in the display unit 13.

More specifically, to evaluate the usability of a certain website, data related to a plurality of test subjects is collected, if possible. To enjoy various services provided in the website is set as each task, and the test subject actually achieves each task. Here, for example, tool "zzzz" can be downloaded from the website of a certain company, homepage "http://www.xxxx.yyyy/" is first accessed, webpage "http://www.xxxx.yyyy/products/html" displaying a product information list is accessed from the homepage, and further webpage "http://www.xxxx.yyyy/products/downzzzz.html" for downloading the tool "zzzz" is accessed here to download the tool. An example in which there is a task using a series of webpages will be described.

The evaluator allows the plurality of test subjects to execute the task, and sets each operation in the homepage, webpage displaying the product information list, and webpage for downloading the product as the subtask. For example, the control unit 11 extracts the operation time and the number of clicks in each page, which are operation log data, from the data obtained during the achieving of the task for each test subject, and calculates an average (arithmetic average) with respect to this data among the test subjects for each subtask. Moreover, a standard deviation σ of each measured value is divided by a square root of a test subject number M (σ/√M), and this value is an error.

Subsequently, the control unit 11 displays a table including the measured value of each test subject, average value, and error in the display unit 13 for each subtask (FIGS. 8(*a*), (*c*)). Moreover, an achieved situation of the task calculated from the measured value ("correct answer" for the completion of the task, if not completed, "incorrect answer"), and whole achievement (%) may also be displayed in the table (FIG. 8(*b*)). The control unit 11 displays this situation as a graph (FIG. 9).

Figure 9:
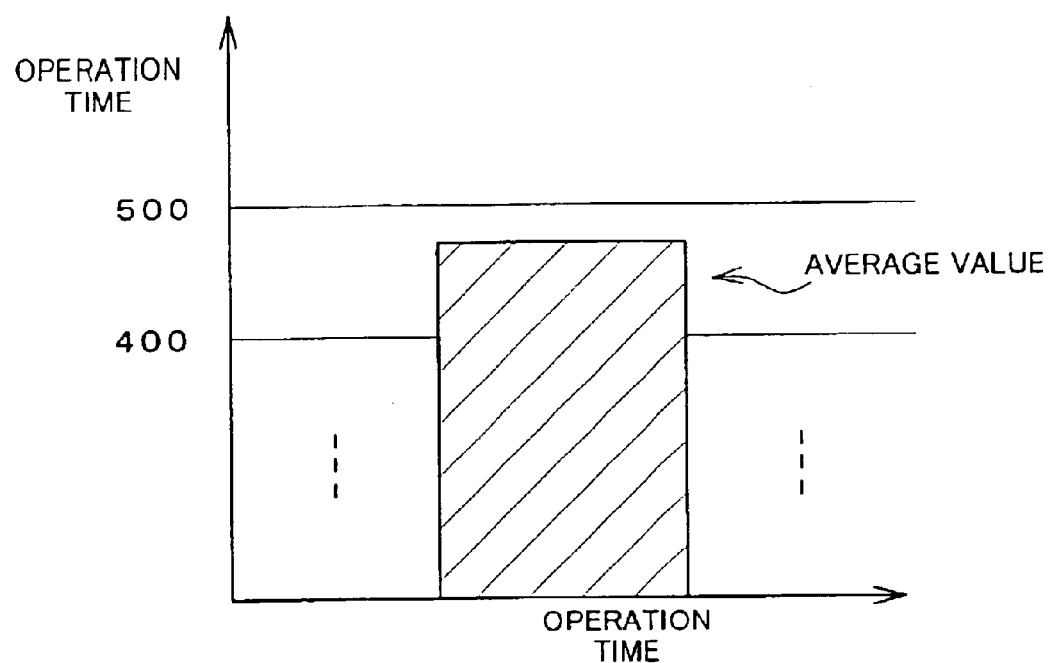
Figure 10:
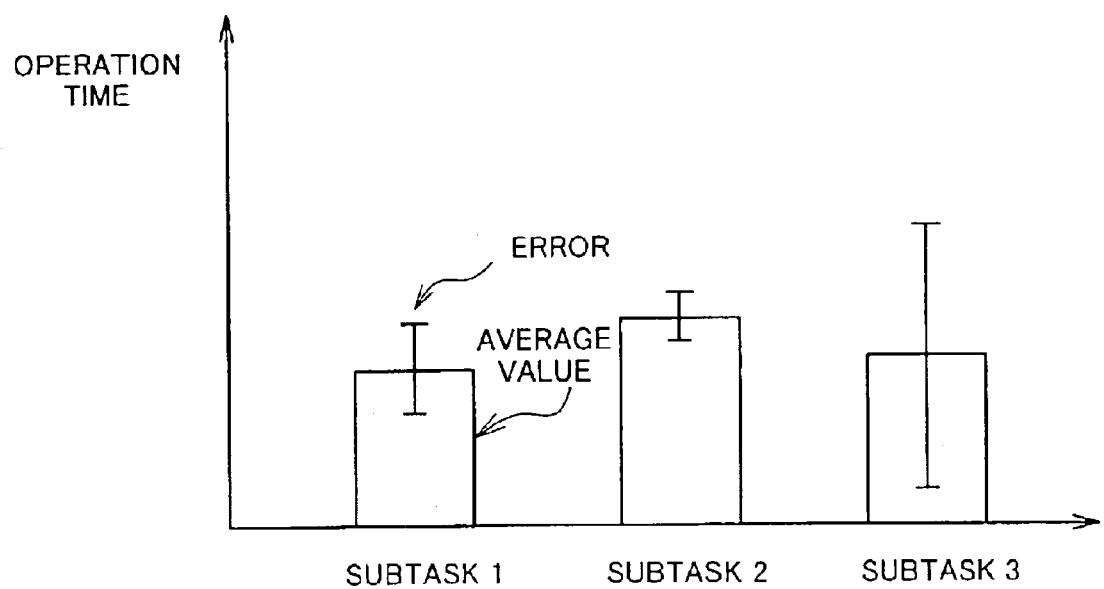

Here, for example, with respect to a plurality of websites in which the evaluator provides a similar service, when the task to use the services offered by each site is set with respect to each test subject, the table or graph shown in FIGS. 8 and 9, respectively, is obtained for each site. Subsequently, the control unit 11 displays the statistical calculation result of the measured value in each site for each subtask in a graph (FIG. 10). Moreover, the unit preferably generates the graph display of the statistical calculation results of the measured value in each site (FIG. 11), and can switch the display to that of the graph shown in FIG. 10.

Figure 12:
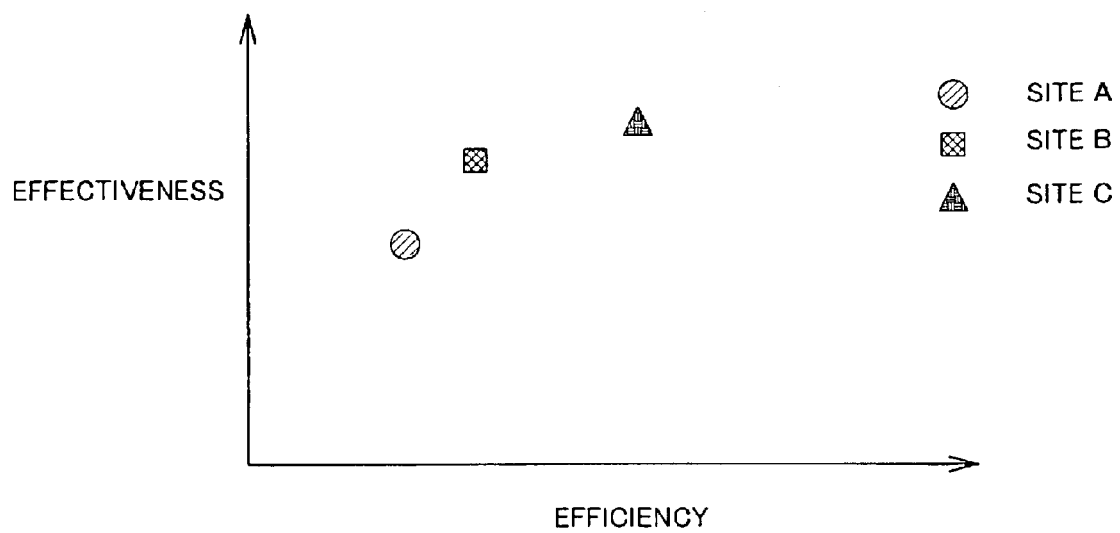
Figure 13:
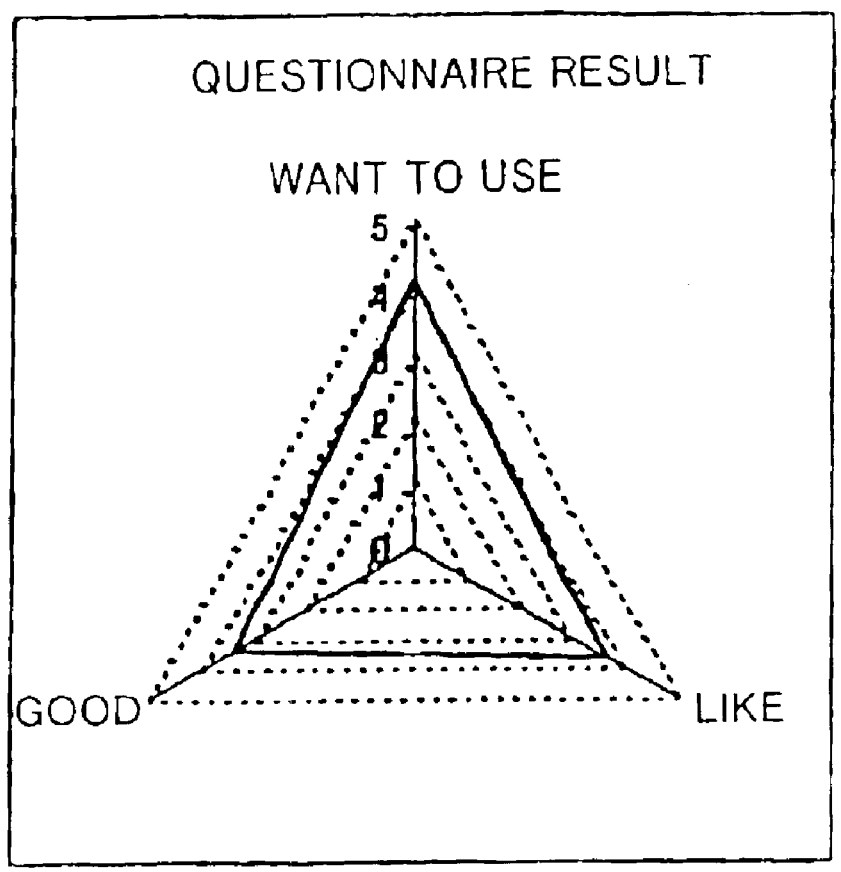

Furthermore, it is also preferable to display a graph associated with the effectiveness, efficiency, and satisfaction for each site. For example, efficiency (e.g., time required for achieving the task) is indicated on the abscissa, effectiveness (e.g., achievement of the task) is indicated on the ordinate, and each site is displayed in the graph (FIG. 12). According to the graphical display, a site having high efficiency and effectiveness indicates a high usability. Moreover, the satisfaction may also be displayed using a triangular graph (FIG. 13). Thereby, it can visually be understood that a larger area of the triangle indicates higher satisfaction.

[Presentation of Anticipated Improvement Result]

The control unit 11 uses the measured value and index displayed as the value of each site in the graph, and calculates statistical values (e.g., medium value, intermediate value, or average value) among sites. It is also preferable to present an anticipated improvement result assuming that at least the average value is obtained after the improvement with respect to a site having a state worse than the statistical value (operation time is long, task achievement is low, etc.).

Figure 11:
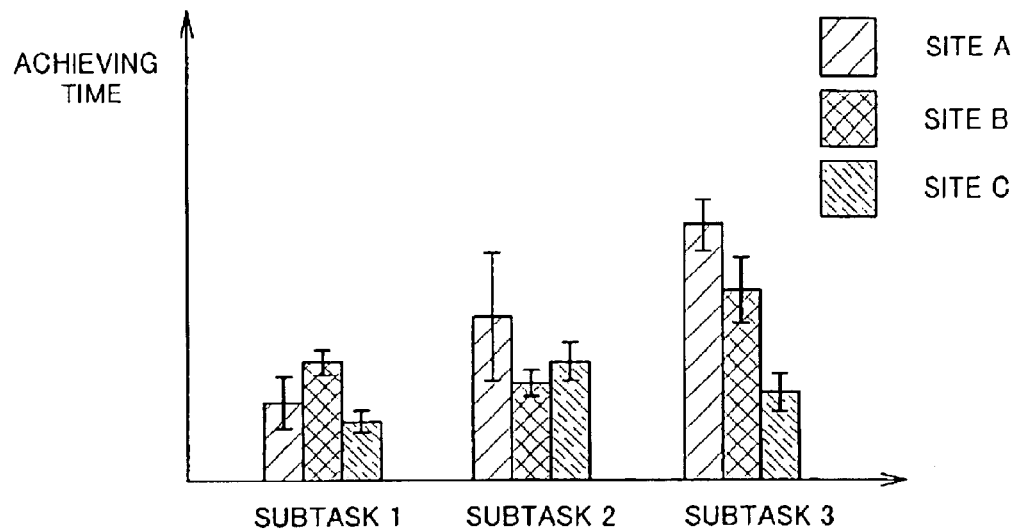

That is, as shown in FIG. 11, the graph of each subtask is displayed in each site, and it is assumed that a third subtask ("Subtask 3" in the drawing) of site A is improved. The statistical values of sites A to C of the measured value with respect to the third subtask are calculated, and the calculated statistical values are displayed. In such a case, the anticipated improvement of the task as a whole may be calculated as follows. That is, with respect to each subtask, the measured value of the noted site is compared with the statistical value of the measured value among the sites. When the measured value of the noted site is worse than the statistical value, the statistical value is used. When the measured value of the noted site is better than the statistical value, the measured value is used to calculate the value of the whole task. Specifically, for the operation time, the operation time is compared with the statistical value of the operation time in each site for each subtask. For the subtask having the operation time of the noted site which is shorter than the statistical value, the operation time of the noted site is used. For the subtask having the operation time of the noted site which is longer than the statistical value, the statistical value is used, and the improvement anticipated result in the whole task is obtained by the sum of the used values.

[Operation]

Therefore, the usability evaluation support apparatus 1 in the present embodiment is used and operates as follows, for example, in the evaluation of the website. The biometric data detection apparatus 2 is attached to the test subject, the website which is the object of the evaluation is accessed, and the task to receive the service in the site is instructed. The test subject operates the operation unit 44 of the apparatus 4, and achieves the instructed task while seeing the screen displayed in the display unit 43. During performance of the task, the control unit 41 accesses the website which is the evaluation object on the network via the network interface 45 following the instruction operation from the test subject, acquires the data of the webpage from the site, and executes processing to display the data in the display unit 43.

On the other hand, the test subject's operation content is recorded as the operation log information which includes at least one item of operation log data related to the operation log information detection apparatus 3. Moreover, the biometric data of the test subject from the biometric data detection apparatus 2, and the event information generated in response to the user's operation from the apparatus 4 are input into the control unit 11. The control unit 11 stores this information in the storage unit 12 together with the time counted by a clock (not shown).

When the test subject either successfully completes (or abandons the task), the control unit 11 presents the questionnaire shown in FIG. 3 to the test subject, allows the subject to provide answers to the questionnaire, and acquires and stores the obtained information in the storage unit 12 as satisfaction data. The control unit 11 also acquires the operation log information from the operation log information detection apparatus 3 and stores the information in the storage unit 12. It is assumed that all operation log data included in the operation log information is also associated with time information obtained from an incorporated clock (not shown) in the operation log information detection apparatus 3. The time of the control unit 11 is preset to the time of the clock (not shown) referred to by the operation log information detection apparatus 3. Alternatively, all components may refer to the same clock.

The operation log data included in the operation log information recorded in this manner includes the operation time, the number of clicks, the movement amount of the pointing device, the number of uses of a help function, the number of error occurrences, the input information as such, the input information amount, and the number of references to an electronic manual. The data included in the event information includes the transfer state of the screen, information displayed in the screen as such, and response time for responding to the operation of the test subject.

Subsequently, the control unit 11 uses this data to calculate the followings:

(1) the number of error occurrences during performance of the task;

(2) level of task achievement at task completion (or giving up) time;

(3) ratio of the number of screen transfers at the task completion or abandonment time to the number of transfers in an ideal case; and (4) the number of instances in which help was accessed during performance of the task. These are weighted/added to calculate the index of effectiveness. Here, the task achievement at the task achieving completion (or giving up) time is determined based on the above-described achieving conditions. That is, the predetermined numeric value is determined as the achievement by the webpage displayed at the time of completion or abandonment of the task.

The control unit 11 also calculates the following:

(1) the time required for achieving the task (i.e., the time corresponding to the sum of the response time, time required for interpreting the displayed content, and time required for the operation);

(2) the number of clicks input;

(3) the movement amount of the pointing device during performance of the task (screen scroll amount, or movement amount itself of the mouse pointer by the movement of the pointing device);

(4) the amount of information input during performance of the task (the number of keystrokes);

(5) the number of references to the electronic manual during performance of the task;

(6) the number of screen transfers required during performance the task;

(7) the sum of response time required for achieving the task;

(8) the amount of content displayed on the display unit 43 during performance of the task (the amount of text; the number of pixels constituting the page; the number of colors, image size, and number of images); and (9) biometric data (amount of eye movement, amount of perspiration, difference of heart rates before and during the operation, blink rate, and the like). These are weighted/added to calculate the index of the efficiency.

Furthermore, the control unit 11 also calculates the following:

(1) the cognitive tendency of the attitude, behavior tendency, and emotional tendency by the analysis of the questionnaire information; and (2) difference (finite difference or ratio) between the reference value (normal time) by the analysis of the biometric data and the biometric data during performance of the task, for example, α wave amount of electroencephalogram/ evaluation by ESAM, diameter of the pupil, amount of perspiration, and the like. The unit calculates the index of the satisfaction as the result of the statistical calculation with respect to these.

The respective indexes calculated in this manner together with the test subject and achieved task are associated with unique identifiers and stored in the storage unit 12. Subsequently, the control unit 11 displays these indexes in the display unit 13 in accordance with evaluator instructions.

Furthermore, the control unit 11 uses a predetermined statistical rule (second rule) using at least a part of each index to calculate the evaluation result corresponding to each index, and displays the calculated evaluation result in the display unit 13 in accordance with evaluator's instructions.

[Evaluation of Effectiveness]

In a specific example of the present embodiment, the index of the effectiveness has two aspects. That is, the aspects include the aspect (task achievement rate) of the ratio of the user who has completed achieving the task, and degree (task success rate) of completion of the achieving of each subtask included in the task during the achieving of the task. The task achievement rate is the index of completeness, when a plurality of test subjects achieve the designated target of the task, and is defined by the ratio of the test subjects who can achieve the final target of the task (ratio of the number of test subjects who have achieved the final target to the number of all the test subjects). This is preferably displayed in the form of a table or bar graph. Moreover, when the task can be divided into a plurality of subtasks, the ratio of the test subjects who have achieved the final target for each subtask may also be used. The task success rate can be calculated only when the designated task can be divided into subtasks. That is, to obtain a usability evaluation result which is more detailed than the task achievement rate, a second index of completeness in achieving the designated target of the task by the plurality of test subjects is calculated. Specifically, for the task success rate, the average of the subtask achievement is calculated as a percentage value. That is, the following is calculated:

$$\Sigma(\text{task achievement for each subtask})/\text{the number of subtasks} \quad [\text{Equation 3}]$$

To visually display the task success, the table or bar graph is preferably displayed. It is to be noted that for the effectiveness, the achievement of each task or task success is the evaluation result itself. On the other hand, the achievement of the subtask is presented for analyzing factors. Additionally, the success of the subtask cannot theoretically be defined.

[Evaluation of Efficiency]

For efficiency, the task operation time, the number of clicks during achieving of the task (the number of task clicks), and the eye movement amount during achieving of the task (task eye movement amount) are evaluation results. The task operation time corresponds to time resources consumed in association with the accuracy and completeness in operating the apparatus 4 to achieve the designated target of the task by the test subject. The data and graphs of test subjects who have successfully completed the task are preferably handled separately from those for test subjects who did not achieve the task. Thereby, any differences in time resources used between the two groups of test subjects, or difference in the use of time resources between subtasks, can be evaluated. For visual display, maximum, minimum, standard deviation, and standard error may be presented in a table, or a bar graph may be used. For a bar graph, the average value may be represented by bar height, maximum and minimum values may be represented as points, and the standard deviation may be represented by width.

The number of task clicks provides an index for quantifying the operation amount in association with the accuracy and completeness in operating the apparatus 4 to achieve the designated target of the task by the test subject. Also in this case, the data and graphs of test subjects who achieved the task are preferably handled separately from that of the test subject who did not achieve the task. For visual display, for the test subjects who have achieved the task and who have not achieved the task, the average total number of test subject clicks may be displayed in the table or bar graph in units of clicks. To display the bar graph, the task operation times of the test subjects who have achieved the task and those who did not achieve the task may be preferably presented in a single graph. As for the number of clicks, even when, for example, the mouse includes a plurality of buttons, the total number is counted without identifying the clicked button, but each double clicking is counted as two clicks. To divide the task into the subtasks, the test subjects are divided into those who achieved the task (not the subtask) and those who did not achieve the task, and data on the number of clicks during achievement of the subtask is presented in a single bar graph. Here, for example, the table shows the maximum/minimum, standard deviation, and standard error, and, in the bar graph, the average value is represented by the height of the bar graph, the maximum/minimum is represented by the point, and the standard deviation is represented by the width.

The task eye movement amount is an index of the recognized load consumed in association with the accuracy and completeness in operating the apparatus 4 in order to achieve the designated target task. Here also, the data and graphs of test subjects who successfully completed the task are preferably handled separately from that of test subjects who did not achieve the task. More specifically, with respect to the task eye movement amount, the test subjects are divided into those who achieved the task and who did not achieve the task, and the test subject's average eyes movement amount is displayed, for example, in units of millimeters, and visually displayed in the form of a table or bar graph. For the eye movement amount, the data of an angle of eye movement obtained from the biometric data is converted to a distance on the display (in the display unit 43), and calculated as the accumulated value of the movement distance between noted focal points (slight movements are ignored). In the bar graph, the eye movement amount of test subjects who achieved the task and that of test subjects who have not achieved the task are preferably displayed together in one graph. For display in a table, data for the test subjects who completed the task, data for the test subjects who did not achieve the task, and composite data for all test subjects is presented together so that the three categories of test subjects can be compared with one another. To divide the task into subtasks, the test subjects are divided into those who achieved the task (not the subtask) and those who did not achieve the task, and all eye movement data collected during performance of the subtask is presented in a single bar graph. It is to be noted that the table shows the maximum/minimum, standard deviation, and standard error, and, in the bar graph, the average value is represented by the height of the bar graph, the maximum/minimum is represented as point data, and the standard deviation is represented by the width.

The task operation time, the number of task clicks, and the task eyes movement amount are used as the evaluation results, and the operation time, the number of clicks, and the eyes movement amount for each subtask are used for analyzing the factors.

[Evaluation of Satisfaction]

Evaluation of satisfaction includes subjective satisfaction evaluation, function factor subjective evaluation, and positive feeling factor subjective evaluation. The subjective satisfaction is a presented index of positive attitude toward the evaluation object after the test subject operates the apparatus 4 to achieve the designated target of the task, or after the test subject performs a task involving accessing the evaluation object from the homepage of the website. It is to be noted that for a task involving free browsing or the accessing of pages linked to the homepage, the entire site including the homepage is the evaluation object, not just the homepage itself. For the designated task (object task), the test subjects are divided into those who successfully completed the object task and who did not achieve the object task, and any differences in subjective satisfaction between members of these two groups is evaluated. Moreover, for example, after pages linked to the homepage are accessed to execute the object task of the site, one object is to compare the indexes of the satisfactions after browsing with that after execution of the object task.

Moreover, in the function factor subjective evaluation, the index of the subjective satisfaction is presented concerning function factors (factors such as ease of use) with respect to the evaluation object after the test subject operates the apparatus 4 to achieve the designated target of the task, or after the test subject performs the task to freely browse the evaluation object from the top page in the website. It is to be noted that for a task involving free browsing or the accessing of pages linked to the homepage, the entire site including the homepage is the evaluation object, not just the homepage itself. For the designated task (object task), the test subjects are divided into those who successfully completed the object task and who did not achieve the object task, and any differences in subjective satisfaction between members of these two groups is evaluated. Moreover, for example, after pages linked to the homepage are accessed to execute the object task of the site, one of the objects is to compare the indexes of the satisfactions after browsing with that after execution of the object task. The results may be preferably displayed in the form of a a radar chart in which subjective evaluation of each function factor is indicated on an axis.

Furthermore, in the positive feeling factor subjective evaluation, the index of the subjective satisfaction is presented concerning positive feeling factors (factors such as impression) with respect to the evaluation object after the test subject operates the apparatus 4 to achieve the designated target of the task, or after the test subject performs the task to freely browse the evaluation object from the top page in the website. It is to be noted that for a task involving free browsing or the accessing of pages linked to the homepage, the entire site including the homepage is the evaluation object, not just the homepage itself. In the designated task (object task), the test subjects are divided into those who successfully completed the object task and who did not achieved the object task, and any differences in subjective satisfaction between members of these two groups is evaluated. Moreover, for example, after accessing pages from the homepage in order to execute the object task in the site, one of the objects is to evaluate the change from a difference between the indexes of the satisfactions after the free browsing and after execution of the object task. The results may be preferably displayed in the form of a radar chart in which subjective evaluation of each function factor is indicated on a separate axis.

What is claimed is:

1. A usability evaluation support apparatus for supporting evaluation of usability of an instrument comprising a display unit for displaying information relative to a given task, the apparatus comprising:

means for acquiring an operation log information which is related to an operation performed by a user and which includes at least one item of operation log data measured during performance of the task;

index evaluation means for generating at least one effectiveness index, efficiency index, and satisfaction index related to achieving a target of the task, wherein the index evaluation means evaluates and generates the effectiveness, efficiency, and satisfaction indexes by a statistical calculation using at least one data item included in at least one of a plurality of measurement items including the operation log information.

2. The usability evaluation support apparatus according to claim 1, further comprising:

means for acquiring at least one item of biometric data measured while the user performs the task, wherein the index evaluation means evaluates the effectiveness, efficiency, and satisfaction indexes by a statistical calculation using at least one data item included in at least one of a plurality of measurement items including the operation log information and the biometric data.

3. The usability evaluation support apparatus according to claim 1, further comprising:

means for generating an effectiveness evaluation result, an efficiency evaluation result, and a satisfaction evaluation result based on at least one effectiveness index, at least one efficiency index, and at least one satisfaction index generated by the index evaluation means by a predetermined statistical calculation.

4. The usability evaluation support apparatus according to claim 1, wherein the statistical calculation in evaluating the effectiveness, efficiency, and satisfaction indexes in the index evaluation means may be varied.

5. The usability evaluation support apparatus according to claim 1, further comprising:

means for generating each of an effectiveness evaluation result, efficiency evaluation result, and satisfaction evaluation result based on at least one effectiveness index, efficiency index, and satisfaction index generated by the index evaluation means by a predetermined statistical calculation, wherein the statistical calculation for generating the effectiveness, efficiency, and satisfaction evaluation results may be varied.

6. A method for supporting evaluation of usability of an instrument comprising a display unit for displaying information for achieving a given task, the method comprising:

a step of acquiring information of an operation log information which is related to an operation performed by a user and which includes at least one item of operation log information measured during performance of the task; and an index evaluation step of generating at least an effectiveness index related to accuracy and completeness in achieving a target task, an efficiency index related to a resource consumed in association with the accuracy and completeness in achieving the target task, and a satisfaction index related to satisfaction of a user achieving the target task, wherein the index evaluation step comprises the step of evaluating and generating the effectiveness, efficiency, and satisfaction indexes by a statistical calculation using at least one data item included in at least one of a plurality of measurement items including the operation log information.

7. The usability evaluation support method according to claim 6, further comprising a step of performing a predetermined statistical calculation to generate each of an effectiveness evaluation result, an efficiency evaluation result, and a satisfaction evaluation result based on at least one effectiveness index, efficiency index, and satisfaction index generated by the index evaluation step.

8. A program which supports evaluation of usability in achieving a given task with respect to an instrument including a display unit for displaying information and which causes a computer to perform:

a procedure of acquiring information of an operation log information related to an operation performed by a user and including at least one item data of the operation log information measured during performance of the task; and an index evaluation procedure of generating at least one effectiveness index related to accuracy and completeness in achieving a target task, efficiency index related to a resource consumed in association with the accuracy and completeness in achieving the target task, and satisfaction index related to satisfaction of a user achieving the target task, wherein the index evaluation procedure comprises a step of performing a statistical calculation in order to evaluate and generate the effectiveness, efficiency, and satisfaction indexes, using at least one item of data included in at least one of a plurality of measurement items including the operation log information.

9. The usability evaluation support program according to claim 8 wherein the program additionally causes the computer to execute a procedure of generating an effectiveness evaluation result, an efficiency evaluation result, and a satisfaction evaluation result based on at least one effectiveness index, at least one efficiency index, and at least one satisfaction index generated by the index evaluation procedure using a predetermined statistical calculation.

* * * * *